May 12, 1970 G. C. BURNS 3,511,212

VAPOR DEPOSITION APPARATUS INCLUDING A POLYIMIDE CONTAINING MASK

Filed May 16, 1968

INVENTOR
GLEN C. BURNS

BY Frank R. Ortolani
ATTORNEY

United States Patent Office 3,511,212

Patented May 12, 1970

3,511,212

VAPOR DEPOSITION APPARATUS INCLUDING A POLYIMIDE CONTAINING MASK

Glen C. Burns, Clarence, N.Y., assignor to E. I. du Pont de Nemours and Company, Wilmington, Del., a corporation of Delaware Filed May 16, 1968, Ser. No. 729,662
Int. Cl. C23c *13/12*
U.S. Cl. 118—49 2 Claims

ABSTRACT OF THE DISCLOSURE

A vacuum deposition chamber having therein means to pass a substrate about a rotatable cooling cylinder disposed above a source of metallizing vapor and a masking strip consisting of an inner ply of fluorocarbon polymer and outer plies of an aromatic polyimide polymer.

BACKGROUND OF THE INVENTION

In producing metallized dielectric film for capacitor use, wide widths of film are metallized in a single pass, with the full width divided to provide narrow metal-free lanes. The resulting film is subsequently slit along the uncoated lanes. In a wound capacitor a matched pair of metallized strips is used, with each having a narrow unmetallized margin at opposite ends of the cylindrical structure thus formed. To provide such uncoated lanes three methods have been generally employed: (1) masking such lanes with a fixed mask interposed between the metal source and the dielectric film, which casts a shadow in the vapor path and leaves a lane free of metal; (2) removal of deposited metal in selected lanes, as by an electrical discharge; and (3) masking by a narrow band maintained in contact with the substrate to be coated. The present invention relates to this last method, which is generally disclosed in U.S. Pat. 2,590,557.

The principal teaching of that patent is that the masking band can move at a speed which is different from that of the base film being metallized. This provides a shearing action at the edge of the masking strip to provide a sharp boundary between the metallized areas and the metal-free lanes.

Masking means heretofore employed have included metal strips, masks of paper and masks of cellophane. If the metal-free band is to be fairly wide, such masks may be employed without too many deficiencies. For masking bands of a narrow width, for example 0.125 inch, which must be maintained at close width tolerances, the cost of fabrication of metal bands from suitable metals is substantial.

Masking bands of non-metallic materials, such as organic films, can be slit to narrow widths on conventional slitting machinery. Band masks of such materials could be employed on an expendable basis. However, the adaption of organic film masks to this practice has not been very successful. For example, in tests thereof very poor uniformity of metal-free margin width was experienced. The cause could be poor tracking, or distortion by shrinkage of the narrow bands upon exposure to the heat of condensation of aluminum. Poor tracking could be caused by inherent weave of a polyester film loop, and also by shrinkage irregularity among bands.

If the masking band is to be used in an arrangement for a single pass, then it is essential to have very thin bands; otherwise the space utilized for the rolls of masking bands in the metallizer would become prohibitive. Furthermore, to achieve sharp boundaries between the metallized areas and the metal-free lanes, it is necessary to have a masking band which is thin; thicker bands, as a result of the "shadow" cast, tend to create a narrow, dark border zone which is undesirable.

Other problems can occur if the masking material is not heat resistant or if it absorbs moisture excessively. Heat resistance is required so that there will be no loss of strength as a result of the heat of condensation of the metal. Moisture absorption can be troublesome in the high vacuum.

STATEMENT OF THE INVENTION

In accordance with the present discovery there is provided, in combination with vacuum metallizing equipment, a band mask comprising an aromatic polyimide. Such material is heat resistant, has a high modulus, is resistant to moisture absorption, can be readily and accurately slit to desired widths and otherwise generally is particularly useful for the indicated application.

The invention will be described in detail in conjunction with the attached drawing in which.

Figure 1:
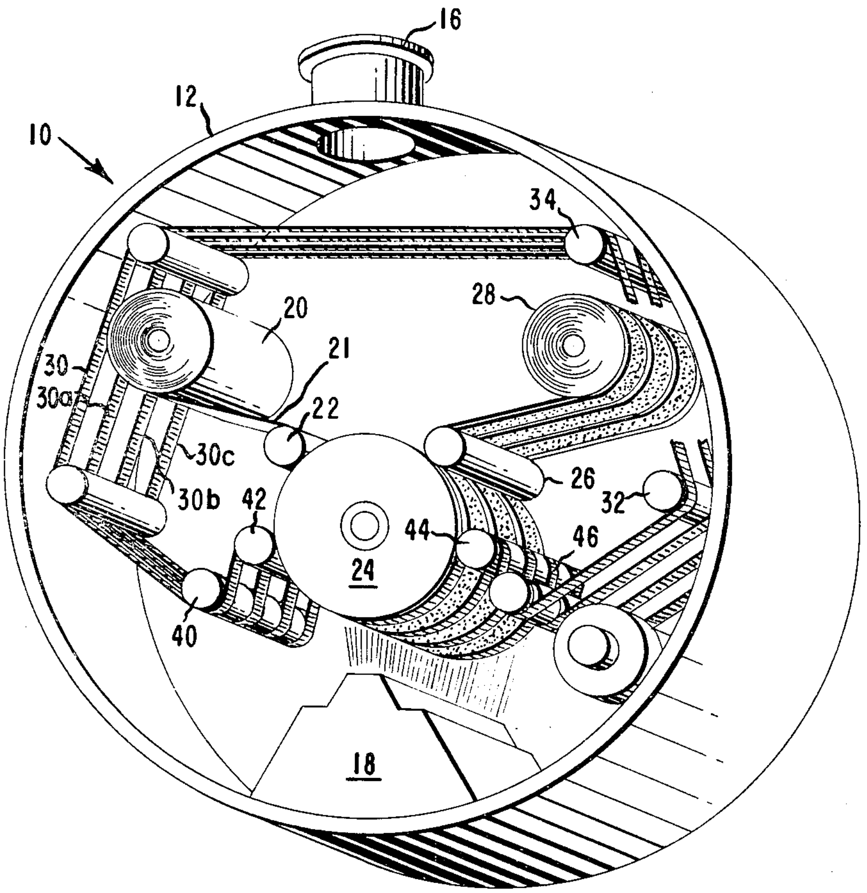
FIG. 1 is a schematic illustration of one form of equipment according to the present invention in a vacuum metallizer.

Referring now to FIG. 1, there is shown a typical vacuum metallizer 10 comprising gas impervious side wall 12 and end walls (not shown) defining a generally cylindrical chamber. Vacuum is drawn through a port 16 by a conventional vacuum pump (not shown). Within the metallizer 10 is a container 18 in which the metal to be used for coating is maintained. A supply roll 20 of film to be coated is mounted at one side of the metallizer chamber. The film 21 (commonly called a "web") is led from its supply roll 20 over a first roller 22 to the surface of a generally cylindrical quench drum 24, which is adapted for internal cooling. The film 21 passes around a substantial portion of the drum 24 to a second roller 26, where it leaves the quench drum 24 and is fed to a film wind-up roller 28.

The container 18, wherein the metal to be vaporized is located, has a mouth or opening positioned near the lower portion of quench drum 24. The container 18, in operation, is heated, as by induction heating means (not shown), to vaporize the metal whereupon it passes to and condenses on the film 21 on the surface of quench drum 24 near the outlet of container 18. To assist metal condensation, quench drum 24 can be provided with an internal coolant as is well known in the art.

Metal-free lanes are provided on the film by using masking bands. The actual number of bands employed will depend on the width of the film, the width of metallized and uncoated lanes desired and like considerations. For purposes of illustration the drawing shows four such masking bands indicated by the numerals 30, **30*a*, 30*b* and 30*c*. These bands are formed as endless loops and extend over rollers 32, 34, 36 and 38, which serve to pass the bands around the upper portion of the chamber peripherally of the supply 20 of film, the wind-up roll 28 and quench drum 24**.

From roller 38 the bands pass to roller 40 located on the up-stream side of quench drum 24, and then pass around roller 42 to the surface of film 21 on the quench drum and leave that drum at roller 44. From roller 44 the masking bands are passed via roller 46 to the aforementioned peripheral rollers 32, 34 etc.

Rollers 42 and 44 are so located with respect to the quench drum 24 that the masking bands are maintained firmly against film 21 on that drum. In addition, the band feed roller 40 and take-up roller 46 suitably are grooved along their surfaces. The bands are received by those grooves whereby precise spacing of the masking bands is achieved. Hence, upon deposition of metal accurate dimensions of deposited metal are obtained upon removal of the bands from the metallized film surface as the film 21 passes roller 44 on its way to film take-off roller 26. Grooved rollers as described can be made by machining circumferential grooves in a roller, or by assembling accurately sized spacers and washers to the desired structure.

While not shown, drive means are provided for the rollers used by the film 21 and the band masks. While not critical, those elements usually are advanced at the same speeds.

As noted hereinbefore, it is of the essence of the present invention to use as the masking band an aromatic polyimide. It has been found that excellent bands can be made of films of wholly aromatic polyimides produced from a tetracarboxylic acid wherein four carboxyl groups are attached to a benzenoid nucleus, with each of two pairs of the carboxyl groups attached to adjacent carbon atoms of the benzenoid ring, and an aromatic diamine wherein the amine nitrogen atoms are attached to aromatic ring carbon atoms, as described in U.S. Pat. 3,179,633 and U.S. Pat 3,179,634. Those aromatic polyimides are now well known in the art, as are the precursor polyamide-acids which are the subject matter of U.S. Pat. 3,179,614. The entire disclosures of the three patents just mentioned in this paragraph are hereby incorporated into this specification by reference. It will be appreciated that additions can be made to the polyimides (usually in the precursor polyamide-acid form) for particular reasons, such as is shown in such U.S. patents as Matray 3,356,760 and Gerow 3,356,759 or the like. The preferred polyimide is that having the recurring unit

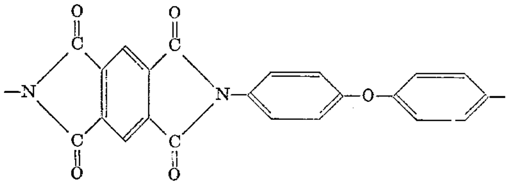

a sufficient number of such units being present in the polymer to provide a self-supporting film, usually sufficient to provide an inherent viscosity of at least 0.3 as measured at 20° C. using a 0.5% solution in a solvent for the polyimide.

In the simplest use of the present invention wherein the mask is stationary or makes only a single pass for each run of the metallizer, ordinary polyimide film, which may be 0.5 to 5 mil thick by 0.125 to 0.250 inch wide, is suitable. However, for the preferred structures of the invention wherein a continuous loop of masking band is recirculated, three embodiments of a loop are available: the first is simple polyimide film sealed at the joint to form the continuous loop, by a heat-resistant sealing composition; the second is a continuous loop formed from polyimide film having a heat-resistant sealable composition on one surface; and the third is a laminate structure of a heat-resistant layer between two layers of polyimide film. The last named structure is preferred.

Various tests of metallizing using polyimide masks have been made. For example, band masks for fixed use were fabricated from a ½ inch wide, ½ mil thick strip of a wholly aromatic polyimide film, and were clamped at one end and looped around and in contact with the web on the quench drum of a vacuum metallizer (as described hereinbefore) so that the masks wrapped for an 60° arc around the quench drum. The masking bands were passed over a support rod positioned to maintain the masks in contact with the web, and weights were supported from the free end to hold the masks firmly in place. An extended length of biaxially oriented polyethylene terephthalate film was passed in contact with the masks and metallized with aluminum. The metallized film was produced with a continuous, uniform-width metal-free lane with sharp demarcation between metallized areas and the metal-free lane. No evidence of scratching of the base film or ragged edges of metal boundaries was apparent, and the masking tape of polyimide was completely free of distortion or shrinkage.

For operation of a metallizer employing a continuous loop, as in the embodiment shown in the drawing, several types of masking bands have been found suitable: one is an uncoated strip of polyimide (the polyimide formed from pyromellitic acid and 4,4'-diamino-diphenyl ether is preferred) which is sealed end-to-end to form a loop of the appropriate length with an adhesive of the parent polyamide-acid from which the polyimide was formed, which upon heating condenses to the polyimide by liberation of water. The seal thus formed was found to be adherent and durable under conditions of condensation of the metal and involving repeated flexing.

A second type of continuous loop band is that formed by sealing the ends of a strip of polyimide film which has a coating of a coplymer of 84 percent tetrafluoroethylene and 16 percent hexafluoropropylene on one side, which can be sealed at elevated temperatures to give an adherent bond durable through repeated flexings at temperatures caused by the condensation of the vapor of the coating material.

Figure 2:
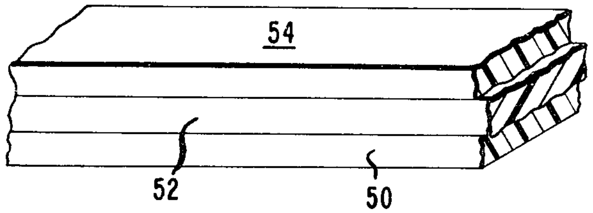
FIG. 2 illustrates a preferred mask structure.

The preferred structure from the standpoint of durability, freedom from distortion and the quality of metallized product formed during its use is a laminated structure illustrated in FIG. 2. Shown in enlarged side view is a three-ply structure composed of polyimide film layer 50, heat-resistant adhesive layer 52 and a second polyimide film layer 54. This structure is particularly suitable by virtue of its abrasion resistance, heat resistance, and toughness provided by the outer layers of polyimide film, while the flexible inner layer permits formation of durable, smooth joints. The materials which were used in construction of this loop were a 3-mil film of polyimide (from pyromellitic dianhydride and 4,4'-diamino diphenyl ether), a 1-mil film of a fluorocarbon polymer (a copolymer of 84 percent tetrafluoroethylene and 16 percent hexafluoropropylene), and another 3-mil film of the polyimide. The joint was made with an overlap of 3 inches. Masking bands having a width of 0.125 and 0.250 were slit from a wide loop; in extended use in coating polyethylene terephthalate film with aluminum for capacitor use in apparatus as described these bands showed superior durability, freedom from distortion, and formed a product having sharply defined metal-free bands which were free from width change.

While the invention has been specifically described it will be appreciated that changes can be made without departing from its scope.

What is claimed is:

1. In a metallizing apparatus comprising a chamber adapted to being evacuated of its atmosphere, a rotatable cylindrical member centrally mounted for rotation in said chamber and adapted for internal cooling, means for guiding and feeding lengthwise a strip of dielectric material continuously to the surface of said cylindrical member, means for receiving and winding said strip as it leaves said surface, a metal vaporizer located beneath the strip and operative to metallize an exposed surface of the strip as the strip advances on said cylindrical member past said vaporizer, means for supporting an elongate masking band in masking contact relation to a portion of the lower surface of the strip with a longitudinal edge of the band located at a longitudinal margin of the surface to be metallized and precluding metallization of the masked surface of the strip, the improvement wherein said elongate masking band consists of a three-ply structure wherein the two outer plies are films of an aromatic polyimide polymer and the inner ply is a film of a fluorocarbon polymer.

2. Apparatus in accordance with claim 1 in which said masking band is a continuous loop adapted for continuous recirculation in said apparatus.

References Cited

UNITED STATES PATENTS

| | | | |
|---|---|---|---|
| 3,408,453 | 10/1968 | Shelton | 161—189 |
| 2,590,557 | 3/1952 | Melsheimer | 118—494 |
| 2,954,752 | 10/1960 | Hayward | 118—505 |
| 2,959,152 | 11/1960 | Byers et al. | 118—505 |
| 3,183,563 | 5/1965 | Smith | 118—49.14 |
| 3,205,855 | 9/1965 | Ault | 118—49 |

OTHER REFERENCES

British Plastics "Polyimides: High Performance Materials," February 1968, pp. 69–72.

MORRIS KAPLAN, Primary Examiner

U.S. Cl. X.R.

117—138.3, 161; 161—189